US010721319B1

(12) United States Patent
Habiger et al.

(10) Patent No.: US 10,721,319 B1
(45) Date of Patent: Jul. 21, 2020

(54) SYSTEM AND METHOD OF TARGETING INTERNET PROTOCOL (IP) NOTIFICATIONS TO MOBILE COMMUNICATION DEVICES

(71) Applicant: Sprint Communications Company L.P., Overland Park, KS (US)

(72) Inventors: Matthew Habiger, Kansas City, KS (US); Jared K. Harpole, Overland Park, KS (US); Mariann R. Sylvester, Ann Arbor, MI (US)

(73) Assignee: Sprint Communications Company L.P., Overland Park, KS (US)

(*) Notice: Subject to any disclaimer, the term of this patent is extended or adjusted under 35 U.S.C. 154(b) by 425 days.

(21) Appl. No.: 15/332,808

(22) Filed: Oct. 24, 2016

(51) Int. Cl.

| | |
|---|---|
| ***H04L 29/06*** | (2006.01) |
| ***G06Q 30/02*** | (2012.01) |
| ***H04L 29/08*** | (2006.01) |
| ***H04W 4/06*** | (2009.01) |
| ***H04L 29/12*** | (2006.01) |
| ***H04W 4/60*** | (2018.01) |
| *G06F 3/0484* | (2013.01) |

(52) U.S. Cl.
CPC .......... *H04L 67/26* (2013.01); *H04L 61/2007* (2013.01); *H04W 4/06* (2013.01); *H04W 4/60* (2018.02); *G06F 3/04842* (2013.01)

(58) Field of Classification Search
CPC .......... H04M 1/72519; H04L 67/2842; H04W 4/0251; H04W 4/12; H04W 8/183; G06Q 30/0241; G06Q 30/0243; G06Q 30/02; G06Q 30/0242; G06Q 30/0277; G06Q 30/0282; G06Q 30/0255
USPC .......................................................... 709/219
See application file for complete search history.

(56) References Cited

U.S. PATENT DOCUMENTS 8,238,888 B2 * 8/2012 Ramer .................. G06Q 30/02 455/414.1
9,071,859 B2 * 6/2015 Lajoie .............. H04N 21/23424
9,288,627 B2 3/2016 Irish et al.
9,531,827 B1 * 12/2016 Onnen .................... H04L 51/04
(Continued)

OTHER PUBLICATIONS

FAIPP Pre-Interview Communication dated Oct. 3, 2107, U.S. Appl. No. 15/415,730, filed Jan. 25, 2017.
(Continued)

*Primary Examiner* — Esther B. Henderson
*Assistant Examiner* — Golam Mahmud

(57) ABSTRACT

A computer system for conducting an Internet protocol (IP) notification campaign. The system comprises an application that receives a request to send notifications to a number of mobile communication devices that identifies a content of the IP notification, analyzes information associated with mobile devices based on the request, where analyzing the information comprises determining a number of IP notifications previously sent to the mobile devices during a predefined period of time and determining other information about the mobile devices, determines a score for each of the analyzed plurality of mobile devices based on the content of the IP notification and the analysis, and subject to a restriction against sending more than a predefined number of IP notifications to a mobile device during the predefined period of time, selects the number of mobile devices based on their scores, and transmits the IP notification to each of the selected mobile devices.

19 Claims, 4 Drawing Sheets

(56) References Cited

U.S. PATENT DOCUMENTS

| | | | | |
|---|---|---|---|---|
| 9,930,161 | B1 | 3/2018 | Brahmadevara et al. | |
| 9,955,332 | B2 * | 4/2018 | Raleigh | H04W 4/50 |
| 9,990,650 | B1 * | 6/2018 | Kakani | G06Q 30/0277 |
| 2002/0194062 | A1 * | 12/2002 | Linde | G06Q 30/02 705/14.52 |
| 2007/0047523 | A1 * | 3/2007 | Jiang | H04M 3/02 370/352 |
| 2008/0009268 | A1 * | 1/2008 | Ramer | G06F 17/30867 455/412.1 |
| 2009/0288113 | A1 * | 11/2009 | Skinner | G06Q 30/02 725/32 |
| 2010/0173658 | A1 * | 7/2010 | Fan | H04L 12/1859 455/466 |
| 2011/0321085 | A1 * | 12/2011 | Debois | H04N 21/4532 725/34 |
| 2012/0191844 | A1 * | 7/2012 | Boyns | G06Q 30/02 709/224 |
| 2012/0259791 | A1 * | 10/2012 | Zoidze | G06Q 10/10 705/319 |
| 2014/0195675 | A1 * | 7/2014 | Silver | H04W 56/0005 709/224 |
| 2014/0200991 | A1 * | 7/2014 | Wu | G06Q 30/0246 705/14.45 |
| 2014/0240122 | A1 * | 8/2014 | Roberts | G16H 40/63 340/539.11 |
| 2015/0039406 | A1 * | 2/2015 | Dubey | G06Q 30/0242 705/14.4 |
| 2015/0112791 | A1 * | 4/2015 | Jain | G06Q 30/0269 705/14.41 |
| 2015/0222636 | A1 * | 8/2015 | Mahaffey | G06F 21/564 726/4 |
| 2015/0289130 | A1 * | 10/2015 | Aleksin | G06Q 30/016 455/404.1 |
| 2016/0132934 | A1 * | 5/2016 | Hartlaub | G06Q 30/0267 705/14.64 |
| 2016/0170991 | A1 * | 6/2016 | Birchall | H04L 12/1859 707/751 |
| 2016/0173700 | A1 * | 6/2016 | O'Connor | H04M 15/60 455/405 |
| 2016/0360336 | A1 * | 12/2016 | Gross | H04W 4/025 |
| 2017/0004263 | A1 * | 1/2017 | Glidewell | G06F 19/00 |
| 2017/0213242 | A1 * | 7/2017 | Sundaram | G06Q 30/0246 |
| 2018/0026929 | A1 * | 1/2018 | Nambiar | H04L 51/24 709/206 |

OTHER PUBLICATIONS

Notice of Allowance dated Nov. 27, 2107, U.S. Appl. No. 15/415,730, filed Jan. 25, 2017.

Brahmadevara, Phaneendra, et al., "System and Method of Caching Targeted Internet Protocol (IP) Notifications to Mobile Communication Devices," filed Jan. 25, 2017, U.S. Appl. No. 15/415,730.

* cited by examiner

SYSTEM AND METHOD OF TARGETING INTERNET PROTOCOL (IP) NOTIFICATIONS TO MOBILE COMMUNICATION DEVICES

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Mobile communication devices may be capable of downloading and installing mobile applications after initial purchase and activation. For example, a user of a mobile phone may download a streaming music application or a gaming application to his or her mobile phone via a wireless connection to the Internet. The user may pay for the right to download and install the mobile application. Alternatively, or in addition, the mobile application developer may obtain revenue indirectly from the installation of the mobile application on the user's mobile phone, for example through advertising revenue.

Internet protocol (IP) notifications may be sent to mobile phones that are unsolicited or untriggered by the mobile phones. An application on the mobile phone may be installed by an original equipment manufacturer (OEM) of the mobile phone that receives and processes IP notifications. The application may post the notifications or a concise summary or headline associated with the notifications to a notifications area of a user interface of the mobile phone. A user may look at the notifications, click or touch a notification summary of one of the notifications, and the application may then present more complete and fuller information related to the notification in a window of a display of the mobile phone. The fuller notification information may, in some cases, comprise a link or reference to other content that may be downloaded conveniently across the Internet to the mobile phone by touching or clicking on the link.

SUMMARY

In an embodiment, a system for conducting an Internet protocol (IP) notification campaign to encourage installation of mobile applications on targeted mobile communication devices is disclosed. The system comprises a data store comprising historical data of previous IP notification campaigns and historic models predicting likelihood of installation of mobile applications associated with the campaigns and a computer system. The computer system comprises a processor, a non-transitory memory, and a notification campaign application stored in the non-transitory memory. When executed by the processor, the notification campaign application receives a request to send an IP notification to targeted mobile communication devices that identifies a number of mobile communication devices to send the IP notification to and a content of the IP notification, where the content comprises a link for installing a mobile application associated with the IP notification, selects a historic model from the data store based on similarity between the request and data of previous IP notification campaigns, and selects a first group of mobile communication devices as a first predefined percentage of the identified number of mobile communication devices based on the historic model and subject to a restriction against sending more than a predefined number of IP notifications to a mobile communication device during a predefined period of time. The notification campaign application further transmits the IP notification to the selected first group of mobile communication devices, analyzes a response of the selected first group of mobile communication devices to the IP notification, creates a first revised model for predicting likelihood of installation of the mobile application associated with the request based on the historic model and based on the analysis of the response of the selected first group of mobile communication devices, selects a second group of mobile communication devices based on the first revised model and subject to a restriction against sending more than a predefined number of IP notifications to a mobile communication device during a predefined period of time, and transmits the IP notification to the selected second group of mobile communication devices.

In another embodiment, a method of a computer system conducting a plurality of concurrent Internet protocol (IP) notification campaigns to encourage installation of mobile applications on targeted mobile communication devices is disclosed. The method comprises receiving by a computer system a first request to send a first IP notification to targeted mobile communication devices that identifies a first number of mobile communication devices to send the IP notification to and a first content of the first IP notification, where the first content comprises a first link for installing a first mobile application associated with the first IP notification, receiving by the computer system a second request to send a second IP notification to targeted mobile communication devices that identifies a second number of mobile communication devices to send the IP notification to and a second content of the second IP notification, where the second content comprises a second link for installing a second mobile application associated with the second IP notification, and analyzing by the computer system information associated with a plurality of mobile communication devices accessed by the computer system from a data store of wireless communication subscriber information comprising historical data about mobile application installations and about numbers of IP notifications sent to the mobile communication devices over a current predefined period of time, where the analyzing is performed based on the first and second requests. The method further comprises identifying by the computer system a first group of the first number of mobile communication devices associated with the first request and a second group of the second number of mobile communication devices associated with the second request based on the analyzing of the information associated with the mobile communication devices and subject to a restriction against sending more than a predefined number of IP notifications to a mobile communication device during the predefined period of time, transmitting by the computer system the first IP notification via a wireless network to each of the first group of mobile communication devices, and transmitting by the computer system the second IP notification via a wireless network to each of the second group of mobile communication devices.

In yet another embodiment, a computer system for conducting an Internet protocol (IP) notification campaign to encourage installation of mobile applications on targeted mobile communication devices is disclosed. The computer system comprises a processor, a non-transitory memory, and a notification campaign application stored in the non-transitory memory. When executed by the processor, the notification campaign application receives a request to send a first IP notification to targeted mobile communication devices that identifies a number of mobile communication devices to send the IP notification to and a content of the IP notification, where the content comprises a link for installing a mobile application associated with the IP notification and analyzes information associated with a plurality of mobile communication devices based on the request to send the IP notification, where analyzing the information comprises determining when the mobile communication devices were activated to receive wireless communication service on a wireless communication network, determining capabilities of the mobile communication devices based on a make and model of the mobile communication devices, determining mobile application installation histories of subscribers associated with the mobile communication devices, determining daily cycles of communication activity level of the mobile communication devices, and determining a number of IP notifications previously sent to the mobile communication devices during a predefined period of time. The notification campaign application further determines a score for each of the analyzed plurality of mobile communication devices based on the content of the IP notification, based on the analysis, and subject to a restriction against sending more than a predefined number of IP notifications to a mobile communication device during the predefined period of time, selects the number of mobile communication devices identified in the request having the highest score, and transmits the IP notification to each of the selected mobile communication devices via a wireless communication network.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
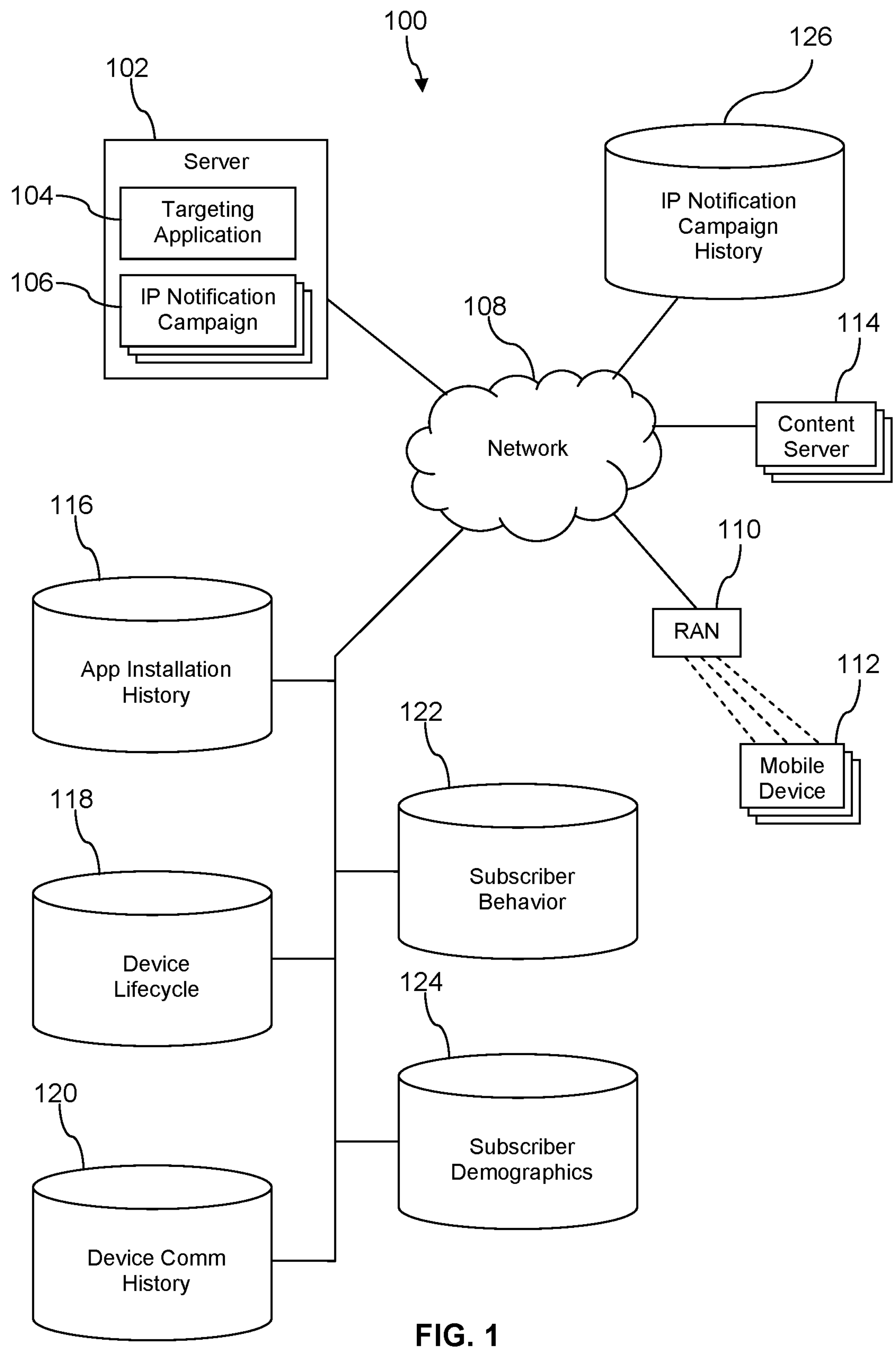
FIG. 1 is a block diagram of a system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

The present disclosure teaches targeted transmission to mobile phones of Internet protocol (IP) notifications promoting download and installation of mobile applications. This entails selecting or targeting mobile phones associated with users who are deemed most likely to respond favorably to the suggestion to install the mobile application. In practice, it is a complicated problem to select this desired set of mobile phones. Adding to the complexity of this problem is the constraint that wireless communication service providers may limit the number of IP notifications that may be sent to any one of their wireless communication service subscribers in a predefined period of time to avoid irritating their subscribers, for example limiting to sending no more than 5 IP notifications to a single subscriber per day. Adding still further to the complexity of this problem is solving the problem across multiple concurrently running mobile application promotion campaigns. Mobile application developers may pay a fee to an IP notification manager based on how many mobile phones their application is installed on in response to the transmitted IP notifications.

The targeting and transmission of IP notifications taught herein is performed by a computer system. Historical information of mobile application downloads and installations on mobile communication devices is collected and stored in a data store. Demographic information associated with subscribers that own the mobile communication devices is stored in a data store. Information about the life cycle and daily usage patterns of the mobile communication devices is stored in a data store. In an embodiment, a client executing on the mobile communication devices may capture information about the environment of the mobile communication device (e.g., other applications installed on the device, current communication behavior of the device, current radio access network (RAN) environmental conditions) when the device selects to download and install an application and transmit that information to the data store. For example, the client may log the amount of time that passes between the receipt of an IP notification promoting downloading and installing a given mobile application and when the subject mobile application is downloaded and installed on the device. This information—the time rate of response to an IP notification—can be a useful feedback for use in tuning prediction models and for evaluating probable responses by users and/or mobile communication devices.

An application executing on the computer system analyzes the historical information, the demographic information, the mobile phone life cycle information, and the usage pattern information to estimate the probability of a given subscriber and/or associated mobile phone responding favorably to an IP notification by downloading and installing the mobile application promoted by the IP notification. This analysis may be performed using a regression analysis. This analysis may comprise identifying a first set of subscribers who have already installed the mobile application on their own mobile phones, identifying a second set of subscribers deemed to resemble the first set of subscribers, and inferring that the subscribers and/or mobile phones associated with the subscribers in the second set of subscribers are more likely to download and install the mobile application. This analysis may comprise identifying a third set of subscribers who have a new mobile phone, for example a mobile phone that was first activated within the past 30 days, and inferring that subscribers in the third set of subscribers are more likely to respond favorably to the IP notification by downloading and installing the mobile application than those who have had their mobile phone for a longer period of time. The analysis can rely upon all these techniques collectively as well as upon other techniques.

It is observed that a wireless communication service provider may have tens of millions of active subscribers.

Keeping track of how many IP notifications each of these subscribers and/or mobile communication devices associated with the subscribers have received during the current window of time (e.g., the last 24 hours), collecting mobile application installation histories of these mobile communication devices, monitoring daily usage patterns of the mobile communication devices is inherently a task for computer processing and would be intractable for a human being to perform manually.

In an embodiment, the application begins with an initial mathematical or predictive model, provides inputs to the model associated with a subscriber and with a mobile application being promoted, and generates a score associated with the likelihood that the subscriber would respond favorably to receiving an IP notification promoting installation of a specific mobile application. This process is repeated across a pool of subscribers (i.e., a pool of subscribers who have not had an excess number of IP notifications sent to them during the current predefined window of time), calculating a score for each of the subscribers in the pool. It may be desired to send IP notifications to a predefined number N of subscribers, for example 5,000 subscribers, 10,000 subscribers, 50,000 subscribers, or some other number of subscribers. The subscribers with the top N scores may be selected or targeted to have the IP notification sent to him or her. The model may be selected from a plurality of predefined models. The predictive model may be selected based on the resemblance of the mobile application being promoted to a previously promoted mobile application for which the predictive model was successful.

In an embodiment, an initial model may be used to select or target a fraction of the N subscribers. The application may then wait to monitor the response of the subscribers sent IP notifications, adapt the model based on the responses, and select a second fraction of the N subscribers based on the adapted model. This process of monitoring responses and adapting the model and selecting more subscribers may be repeated any desirable number of times to send the IP notification out to the N subscribers.

Sometimes the system will be called upon to manage and/or carry out a plurality of IP notification campaigns concurrently. In this case, the problem becomes jointly optimizing the outcomes of two or more concurrently executing IP notification campaigns. To some extent the concurrent campaigns may, in some instances and depending upon the type of notification being promoted by the different IP notifications, compete with each other for the subscribers and/or mobile phones most likely to install the subject mobile applications. For example, it may be that a subscriber who downloads and installs a first mobile application is less likely to install a second different mobile application very shortly thereafter. The concurrent campaigns may compete with each other in a different way, for example when the most desirable (highest targeting score) subscribers and/or mobile phones are one IP notification short of their periodic number of allowed IP notifications for the current time period. For example, two campaigns may wish to send IP notifications, now, to a subscriber who has already received 4 IP notifications within the last 24 hours. If the wireless communication service provider limits the number of IP notifications that may be sent to its subscribers to 5 IP notifications within a 24 hour time period, for example, only one of the two campaigns can send an IP notification to the subject subscriber and/or mobile phone.

The resolution of targeting among a plurality of concurrent IP notification campaigns can be achieved in a number of different manners and some of the manners may be combined. According to one resolution tactic, a subscriber or mobile phone which falls into the selection of two or more concurrent IP notification campaigns is conceded to the campaign that it scores best in (e.g., where the score of predicted disposition to respond to the subject IP notification favorably by downloading and installing the subject mobile application). According to a second resolution tactic, a subscriber or mobile phone which falls into the selection of two or more concurrent IP notification campaigns is conceded to the campaign that has the most IP notifications remaining to be sent out. According to a third resolution tactic, a subscriber or mobile phone that falls into the selection of two or more concurrent IP notification campaigns is conceded to the campaign that has completed the smallest percentage of its IP notification campaign. Sometimes different IP notification campaigns may designate different time periods over which they wish the IP notifications to be sent out. In this case, a campaign with more time remaining to complete their campaign may be denied the subscriber. Alternatively or additionally, a campaign that initially specified a longer total duration over which to complete its IP notification campaign but is now approaching the end of that duration may be given precedence in obtaining a subscriber desired by a plurality of campaigns. If a given subscriber has 2 IP notifications remaining in his or her periodic allocation of IP notifications, these same methods may be used to select the 2 different campaigns that are allowed to send to the subject subscriber.

The IP notification targeting system taught herein provides for improving wireless communication service subscriber's experiences by restricting the number of IP notifications that are sent to those subscribers per period of time and sending more interesting, because more targeted, promotions for installing mobile applications to those subscribers. In this system, subscribers who rarely or never install mobile applications are less likely to receive these IP notifications, which presumably they may not wish to receive, because their projected likelihood of downloading and installing the subject mobile applications is calculated to be low. Mobile application developers benefit from this system in that their mobile applications are promoted to targeted subscribers who are most likely to want to install their applications, thereby paying money to the mobile application developers or supporting an indirect revenue stream through advertising for the developers.

Turning now to FIG. 1, a system 100 is described, in an embodiment, system 100 comprises an Internet protocol (IP) notification server computer system 102 that comprises an IP notification targeting application 104. When the IP notification server 102 is executing the targeting application 104, it may store artifacts related to one or more IP notification campaigns 106. The system 100 further comprises a network 108, a radio access network (RAN) 110, and a plurality of mobile communication devices 112.

The network 108 comprises one or more private networks, one or more public networks, or a combination thereof. The RAN 110 comprises a plurality of cell sites such as cell towers, enhanced node Bs, base transceiver stations. The RAN 110 provides wireless communication links to the mobile communication devices 112 and provides communications coupling of the mobile communication devices 112 to the network 108. The RAN 110 may provide wireless communication links to the mobile communication devices 112 according to one or more of a long term evolution (LTE), a code division multiple access (CDMA), a global system for mobile communications (GSM), and/or a worldwide operability for microwave access (WiMAX) wireless telecommunication protocol. In an embodiment, the RAN 110 comprises tens of thousands of cell sites. The RAN 110 may further comprise server computers such as home location registers (HLRs), visitor location registers (VLRs), and other equipment that support the operation of the cell sites. The mobile communication devices 112 comprise one or more of mobile phones, personal digital assistants (PDAs), media players, wearable computers, headset computers, laptop computers, notebook computers, and tablet computers. In an embodiment, the system 100 comprises millions of mobile communication devices 112.

The system 100 further comprises a plurality of content servers 114 that may provide mobile applications for downloading to the mobile devices 112. The content servers 114 may further provide support to mobile applications that have been downloaded to the mobile devices 112. In some contexts, the content servers 114 may be referred to as application servers. The different content servers 114 may be operated by different mobile application developers. The mobile application developers may send requests to initiate IP notification campaigns to the targeting application 104 executing on the IP notification server 102. The IP notification campaigns may send IP notifications to selected or targeted numbers of the mobile devices 112, where the IP notifications prompt the user of the selected mobile devices 112 to download and install a mobile application, for example a mobile application sold by the mobile application developers.

The system 100 further comprises one or more data stores comprising information that supports the targeting application 104 in targeting IP notifications to mobile devices 112. While a plurality of data stores are illustrated in FIG. 1 and described herein as being separate, it is understood that some of the data stores illustrated as separate may be combined into a single data store. Further, some data stores illustrated as a single data store in FIG. 1 may, in some implementations, be deployed as two or more separate data stores. The system 100 may comprise a mobile application installation history data store 116, a mobile communication device lifecycle data store 118, a mobile communication device communication history data store 120, a mobile communication service subscriber behavior data store 122, a mobile communication service subscriber demographics data store 124, and an IP notification campaign history data store 126.

The mobile application installation history data store 116 may comprise information and data about installations of mobile applications on the mobile devices 112. The information may identify specific mobile applications that have been installed on specific ones of the mobile devices 112. The information may indicate how the mobile application was installed on the mobile devices 112, for example if a mobile application was installed shortly after the mobile device 112 was initially activated or if the mobile application was installed at a time when an advertising campaign was underway via television or in browser mobile advertisement. The mobile communication device lifecycle data store 118 may comprise information that indicates the age or point in the lifecycle that some of the mobile communication devices 112 are at. For example, the lifecycle data store 118 may indicate that a first mobile device 112 was first activated 2 weeks ago, that a second mobile device 112 was first activated 12 months ago, and that a third mobile device 112 was first activated 23 months ago.

The mobile communication device communication history data store 120 may comprise data about the communication history and/or communication activities of the mobile communication devices 112. This information may promote, for example, analysis and determination of a busy hour for a specific mobile device 112—an hour when the subscriber is using his or her mobile communication device 112 most heavily. This information may promote, for example, analysis and determination of a volume of text messaging, a volume of browsing activity, a volume of game playing activity, a volume of email activity, and a volume of voice call activity initiated by the subscriber on his or her mobile communication device 112.

The mobile communication service subscriber behavior data store 122 may comprise information about a plurality of subscribers associated with the mobile communication devices 112, for example their on-line purchase activities, their web site browsing activities, their social networking activities, their mobile application usage activities, and the like. The mobile communication service subscriber demographics data store 124 may comprise demographic information about mobile communication service subscribers, for example age, sex, education, marital status, income level, and postal address.

The IP notification campaign history data store 126 may comprise a variety of information about completed as well as on-going IP notification campaigns. This information may comprise results of IP notification campaigns. The information may comprise selection criteria used to target subscribers and/or mobile communication devices 112 to receive the subject IP notification of a notification campaign. The information may comprise prediction models used to target subscribers and/or mobile communication devices 112 to receive the IP notification of a notification campaign.

An application developer may contract with or otherwise hire an enterprise that provides targeted delivery of IP notifications to mobile devices, for example an enterprise using the IP notification targeting application 104. The application developer may request that an IP notification campaign be conducted on its behalf and in accordance with its criteria by the IP notification targeting application 104. The application developer identifies what mobile application is to be promoted and provides information that is sufficient for mobile communication devices 112 to download and install the subject mobile application, for example a uniform resource locator (URL) or other reference. The application developer may further identify how many mobile devices 112 it would like the IP notification to be sent to. The application developer may identify a time period over which the IP notification campaign is to be conducted. The application developer may identify some broad characteristics of a targeted subscriber and/or mobile communication device 112 to send IP notices to. In an embodiment, a wireless communication service provider may operate the IP notification server 102 and may be paid based on a number of successful IP notifications (i.e., IP notifications that result in the subscriber and/or mobile communication device 112 downloading and installing the mobile application that is the object of the IP notification). Additionally, the targeting application 104 desirably can select a much more targeted selection of subscribers and/or mobile communication devices 112 than that identified by the broad characteristics provided by the mobile application developer, for example based on additional information known to the wireless communication service provider.

When the mobile application developer or another requests an IP notification campaign be conducted by the IP notification, the IP notification targeting application 104 creates an IP notification campaign 106 that corresponds to the request. The IP notification campaign 106 comprises computer artifacts such as a task in memory and/or stored states associated with the IP notification campaign to be conducted. The IP notification campaign 106 stores the information from the campaign request received from a mobile application developer or other. The IP notification campaign 106 may store information about what mobile communication devices 112 have been sent IP notifications for this campaign already, the results that IP notifications sent during the campaign have achieved, a subscriber interest prediction model or models, and other information.

The IP notification targeting application 104 may determine, select, or target a set of mobile communication devices 112 to which to send IP notifications associated with a specific campaign. This selection desirably chooses the mobile communication devices 112 deemed most likely to respond favorably to the IP notification, i.e., to download and install the mobile application promoted by the subject IP notification. This selection may be made subject to one or more constraints.

In an embodiment, one constraint applied by the IP targeting application 104 when selecting devices 112 to which to send IP notifications may be that IP notifications cannot be sent to mobile devices 112 in excess of a predefined rate per predefined period of time. Thus, if a mobile communication device 112 has already been sent the predefined number of IP notifications within the current defined period of time, that device 112 may be excluded from the population of devices 112 analyzed for targeting. For example, in an embodiment, no more than 5 IP notifications are allowed to be sent to any single mobile device 112 per day or per 24 hour period of time. In other cases the constraint may be some other number of IP notifications per day, for example no more than 3 IP notifications per day or per 24 hour period of time, no more than 8 IP notifications per day or per 24 hour period of time, no more than 10 IP notifications per day or per 24 hour period of time, no more than 15 IP notifications per day or per 24 hour period of time, or some other number of IP notifications per some predefined period of time.

In an embodiment, a different constraint applied by the IP targeting application 104 when selecting devices 112 to which to send IP notifications may be that mobile communication devices 112 that have already installed the mobile application promoted by the IP notification may not have the IP notification sent to them and/or are excluded from consideration and/or scoring. The IP notification targeting application 104 may identity mobile devices 112 that have already installed a specific mobile application by searching the mobile application installation history data store 116. This constraint may be desirably applied to avoid wasting a limited number of allowable IP notifications allowed to be sent to a single mobile communication device 112 per defined period of time.

The mobile communication devices 112 that are not excluded by one or the other of the two constraints above may be analyzed to select or target a limited number for sending IP notifications to. The request to run an IP notification campaign sent by a mobile application developer or other to the IP notification targeting application 104 may specify a number of IP notifications to be sent out. Alternatively, the targeting application 104 may itself determine that only a fixed number of IP notifications are to be sent out for the IP notification campaign. The IP notification campaign may be scoped to send out 100 IP notifications, 1,000 IP notifications, 50,000 IP notifications, or any other number of IP notifications. The problem for the IP notification targeting application 104 is to select the best N number of mobile communication devices 112 for sending the IP notification to, where best means most likely to respond favorably to the IP notification (e.g., download and install the mobile application promoted by the IP notification).

Other constraints may be a region or postal address of the subscriber associated with the mobile communication device 112. The IP notification targeting application 104 may select a predetermined number of mobile communication devices 112, ignoring those devices 112 that are excluded by considerations of constraints, by analyzing the information in the data stores, for example in the application installation history data store 116, in the device lifecycle data store 118, in the device communication history data store 120, in the subscriber behavior data store 122, and in the subscriber demographics data store 124. The analysis may calculate scores for each of the remaining (e.g., not excluded by consideration of constraints) mobile communication devices 112.

If a subscriber is known to have quickly installed mobile applications in response to previous IP notifications, this may boost the score of that subscriber relative to another subscriber that responded more slowly or not at all to previous IP notifications. This analysis may be restricted to a class or category of mobile application, restricted to previous IP notifications related to mobile applications of the same general category as the mobile application promoted in the IP notification in the present campaign. If a subscriber is known to have previously installed a mobile application that is similar to or of the same category (for example gaming mobile application, banking mobile application, sports mobile application, social networking mobile application) of the mobile application promoted in the IP notification in the present campaign, this may decrease the score of that subscriber relative to another subscriber that has not previously installed a mobile application from the same category.

If a subscriber is known to have activated his or her mobile communication device 112 recently, for example within the previous month, this may boost the score of that subscriber relative to another subscriber that has had his or her phone for more than 6 months but less than 18 months, on the theory that a subscriber having a new phone may be more inclined to install another mobile application. If the mobile communication device 112 was activated about 12 months ago, this may reduce the score of that subscriber. If the mobile communication device 112 was activated about 23 months ago, this may reduce the score of that subscriber on the theory that he or she will be upgrading his or her mobile communication device 112 soon.

The IP notification targeting application 104 may adjust the score based on a device use history, based on information stored in the mobile communication device communication history data store 120. For example, the targeting application 104 may learn that a subscriber of a mobile communication device 112 is most active at 9 AM in the morning, it is planning to launch the subject IP notification campaign 106 at 8:45 AM, and adjust the score of that mobile communication device 112 higher on the theory that that device will be more likely to see the IP notification sent to it promptly and to possibly respond to it.

The IP notification targeting application 104 may adjust the score based on the demographics of the subscriber associated with a mobile device 112 and/or based on the behavior of the subscriber, for example based on on-line electronic purchases made by the mobile communication device 112.

The IP notification targeting application 104 can rank the analyzed and non-excluded mobile communication devices 112 based on the analyzed scores and select the N top scoring devices to send IP notifications to, where N is the number of devices that IP notifications are to be sent to. Having selected the N mobile communication devices 112, the IP notification targeting application can send IP notifications to each of the selected devices.

In many cases, a plurality of IP notification campaigns may be concurrently active. The different campaigns may be competing for the same mobile communication mobile devices 112 in some cases, and the question arises how to arbitrate equitably between incompatible selections of the same mobile device 112 by different IP notification campaigns. These conflicts may be resolved by one or more of different methods. For example, the campaign that associates the highest score for a mobile device 112 may be conceded the opportunity to select the mobile device 112. The campaign that is closest to completion may be conceded the opportunity to select the mobile device 112. The campaign that has the lower number of IP notifications to be sent out in total may be conceded the opportunity to select the mobile device 112. In an embodiment, a mobile application developer that pays a higher fee or per installation payment may be conceded ties for selecting the mobile device 112.

In an embodiment, when two or more different IP notification campaigns are concurrently active, a first portion of a first campaign may be completed (i.e., a first portion of a total number of IP notifications of the first campaign are sent to selected mobile communication devices), then a first portion of a second campaign may be completed, then a second portion of the first campaign may be completed, then a second portion of the second campaign may be completed, and so on. If three or more IP notification campaigns are active concurrently a similar interleaving of partial completion of each IP notification campaign may be employed. The number of portions into which each IP notification campaign may be broken into can vary in different embodiments. For example, the number of portions may vary between 2 and 10. This interleaving may provide an equitable resolution of the competition among multiple concurrent IP notification campaigns.

In an embodiment, the IP notification targeting application 104 uses a mathematical and/or predictive model to generate the scores of mobile communication devices 112 and/or associated subscribers. In an embodiment, a regression analysis may be employed to generate the scores of the mobile communication devices 112, wherein the regression analysis takes into consideration demographics of subscribers associated with the mobile communication devices 112, how long each mobile communication device 112 has been activated, a mobile application installation history of at least some of the mobile communication devices 112, and a communication history of at least some of the mobile communication devices 112, for example by accessing data in data stores 116, 118, 120, 122, and 124.

The IP notification campaign history data store 126 may store predictive models associated with previous IP notification campaigns 106. The targeting application 104 may select a previous or historical model based on a success of that model (i.e., based on analyzing the results of a previous IP notification campaign that employed that historical model) or based on a similarity between the mobile application associated with the model to the mobile application associated with the current IP notification campaign 106. Each mobile communication device 112 and/or associated subscriber, excepting those that are excluded due to constraints, may be scored using the selected model by inputting information about the subject IP notification campaign 106 as well as data about the mobile communication devices 112 and associated subscribers accessed from one or more of the data stores 116, 118, 120, 122, 124 into the model. The score may represent or be proportional to an estimated probability of the subject mobile communication device responding favorably to the subject IP notification, i.e., by downloading and installing the mobile application promoted by the IP notification. Choosing to send IP notifications to mobile communication devices estimated to have a higher probability of responding favorably may be referred to as targeting such mobile devices or as targeted IP notifications.

In an embodiment, the model used to determine scores may be adopted in-stream, as the subject IP notification campaign advances. For example, the campaign may be divided into a first third, a second third, and a final third. A historical model read from the IP notification campaign history data store 126 may be used to score and conduct the first third of the IP notification campaign, for example to select a first group of mobile communication devices 112 to which send the IP notification. The results from that first third of the campaign may be allowed time to come in. The results may be use to adapt the model. The first adopted model or first revised model may be used to score and conduct the second third of the IP notification campaign, for example to select a second group of mobile communication devices 112 to which to send the IP notification. The results from that second third of the campaign may be allowed time to come in. The results may be used to adapt the model again. The second adopted model or second revised model may be used to score and conduct the final third of the IP notification campaign, for example to select a third group of mobile communication devices 112 to which to send the IP notification. This technique of adopting the predictive model in-stream may be done for any desired distribution or partitioning of the N number of IP notifications to be sent out. In an embodiment, the historical model may be used to score and conduct the first 15% of the IP notification campaign, the first revised model may be used to score and conduct the next 35% of the IP notification campaign, and the second revised model may be used to score and conduct the final 50% of the IP notification campaign.

Figure 2A:
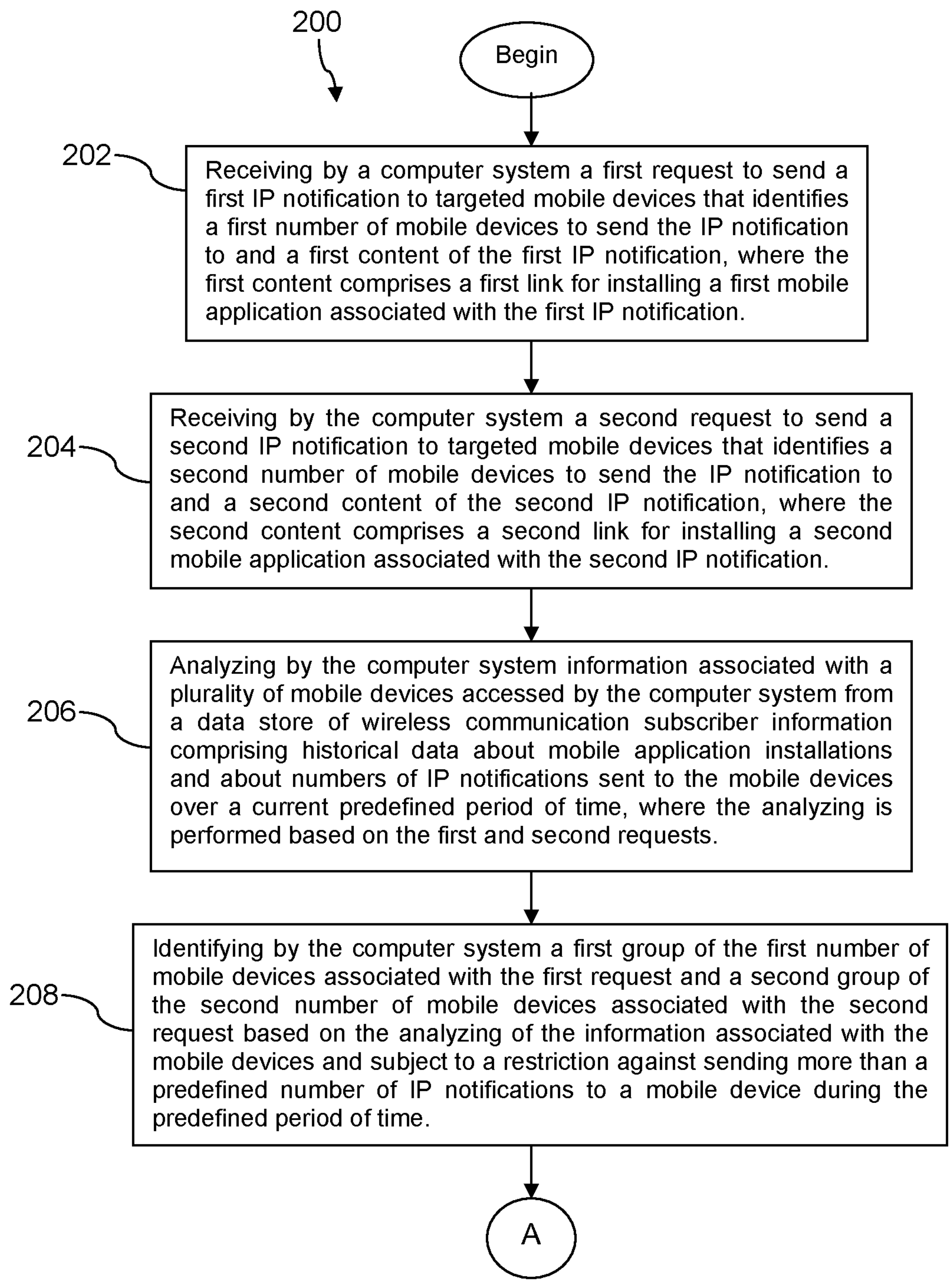
FIG. 2A and FIG. 2B are a flow chart of a method according to an embodiment of the disclosure.
Figure 2B:
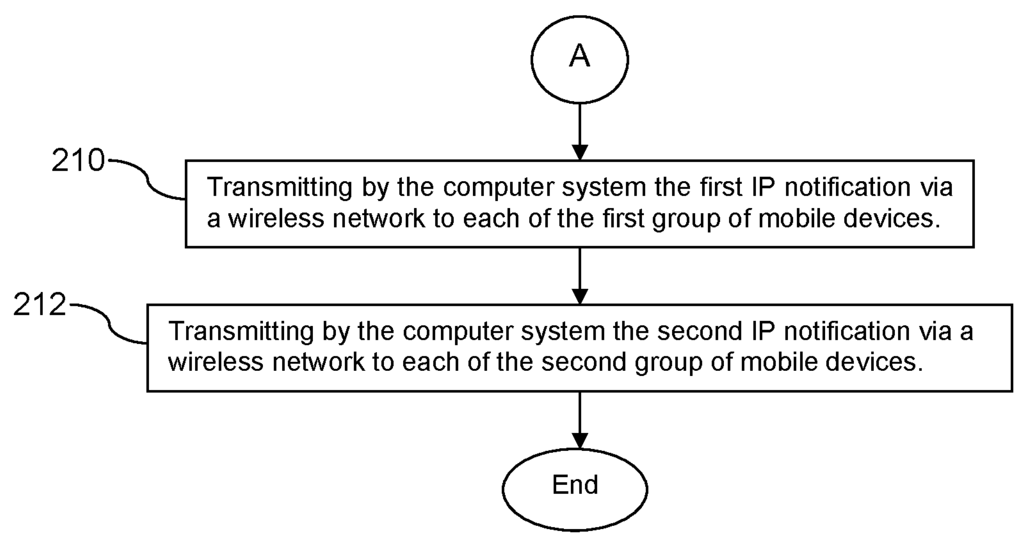

Turning now to FIG. 2A and FIG. 2B, a method 200 is described. The method may be used by a computer system to conduct a plurality of concurrent Internet protocol (IP) notification campaigns to encourage installation of mobile applications on targeted mobile communication devices. At block 202, a computer system receives a first request to send a first IP notification to targeted mobile devices that identifies a first number of mobile devices to send the IP notification to and a first content of the first IP notification, where the first content comprises a first link for installing a first mobile application associated with the first IP notification. For example, the IP notification targeting application 104 executing on the IP notification server computer system 102 receives the first request.

At block 204, the computer system receives a second request to send a second IP notification to targeted mobile devices that identifies a second number of mobile devices to send the IP notification to and a second content of the second IP notification, where the second content comprises a second link for installing a second mobile application associated with the second IP notification. For example, the IP notification targeting application 104 executing on the IP notification server computer system 102 receives the second request.

At block 206, the computer system analyzes information associated with a plurality of mobile devices accessed by the computer system from a data store of wireless communication subscriber information comprising historical data about mobile application installations and about numbers of IP notifications sent to the mobile devices over a current predefined period of time, where the analyzing is performed based on the first and second requests. For example, the IP notification targeting application 104 analyzes the information. The analyzing may comprise determining a first score of the likelihood for mobile communication devices 112 to respond favorably to the first IP notification and determining a second score of the likelihood for mobile communication devices 112 to respond favorably to the second IP notification and where identifying the first group and the second group of mobile communication devices 112 based on the analyzing comprises identifying the first group and the second group of mobile communication devices 112 at least in part based on the first score and the second score. If a conflict arises where the same mobile communication device 112 is selected in each of the first group and the second group, the subject mobile communication device 112 may be conceded to the first group if the first score is higher than the second score or may be conceded to the second group if the second score is higher than the first score. The scoring may be done as described above, using a regression model and/or based on a predictive model and/or a series of adapted predictive models.

At block 208, the computer system identifies a first group of the first number of mobile devices associated with the first request and a second group of the second number of mobile devices associated with the second request based on the analyzing of the information associated with the mobile devices and subject to a restriction against sending more than a predefined number of IP notifications to a mobile device during the predefined period of time. For example, the IP notification targeting application 104 identifies the first group and the second group of mobile communication devices 112.

At block 210, the computer system transmits the first IP notification via a wireless network to each of the first group of mobile devices. For example, the IP notification targeting application 104 executing on the IP notification server computer system 102 sends IP notifications to each of the first group of mobile communication devices 112 via the network 108 and via the RAN 110.

At block 212, the computer system transmits the second IP notification via a wireless network to each of the second group of mobile devices. For example, the IP notification targeting application 104 executing on the IP notification server computer system 102 sends IP notifications to each of the second group of mobile communication devices 112 via the network 108 and via the RAN 110.

Figure 3:
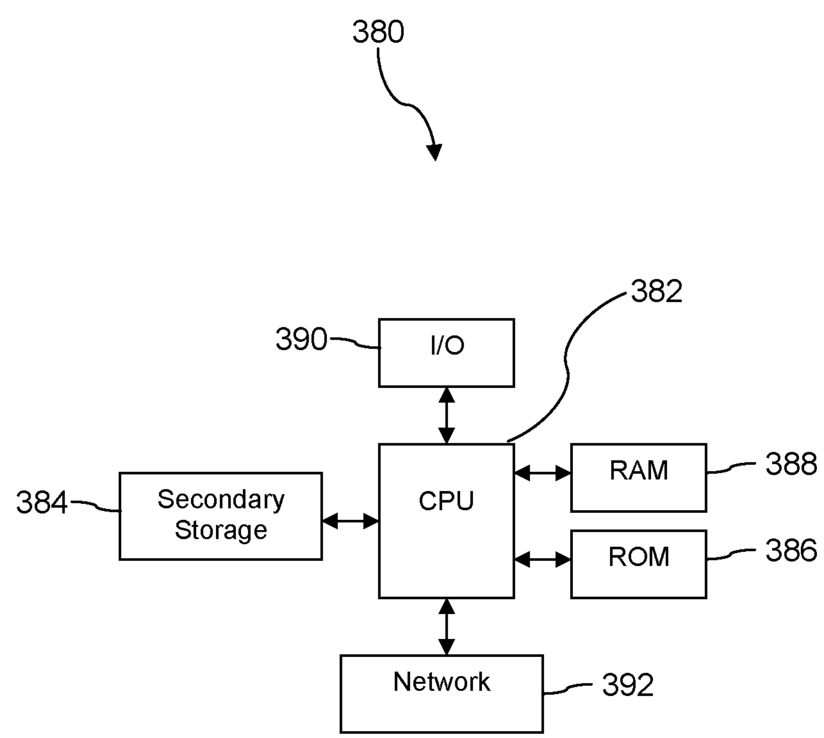
FIG. 3 is a block diagram of a computer system according to an embodiment of the disclosure.

FIG. 3 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards that promote radio communications using protocols such as code division multiple access (CDMA), global system for mobile communications (GSM), long-term evolution (LTE), worldwide interoperability for microwave access (WiMAX), near field communications (NFC), radio frequency identity (RFID), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of a computer system conducting a plurality of concurrent Internet protocol (IP) notification campaigns to encourage installation of mobile applications on targeted mobile communication devices, comprising:

receiving by a computer system a first request to send a first IP notification to targeted mobile communication devices that identifies a first number of mobile communication devices to send the IP notification to and a first content of the first IP notification, where the first content comprises a first link for installing a first mobile application associated with the first IP notification;

receiving by the computer system a second request to send a second IP notification to targeted mobile communication devices that identifies a second number of mobile communication devices to send the IP notification to and a second content of the second IP notification, where the second content comprises a second link for installing a second mobile application associated with the second IP notification;

analyzing by the computer system information associated with a plurality of mobile communication devices accessed by the computer system from a data store of wireless communication subscriber information comprising historical data about mobile application installations and about numbers of IP notifications sent to the mobile communication devices over a current predefined period of time, where the analyzing is performed based on the first and second requests, and wherein the analyzing comprises determining a first score of the likelihood for mobile communication devices to respond favorably to the first IP notification and determining a second score of the likelihood for mobile communication devices to respond favorably to the second IP notification and where identifying the first number and the second number of mobile communication devices based on the analyzing comprises identifying the first group and the second group of mobile communication devices at least in part based on the first score and the second score;

identifying by the computer system a first group of the first number of mobile communication devices associated with the first request based on the analyzing of the information associated with the mobile communication devices and based on a restriction against sending more than a predefined number of IP notifications to a mobile communication device during the predefined period of time such that the first group of mobile communication devices includes a portion of the first number of mobile communication devices that have not received more than the predefined number of IP notifications during the predefined period of time;

identifying by the computer system a second group of the second number of mobile communication devices associated with the second request based on the analyzing of the information associated with the mobile communication devices and based on the restriction against sending more than the predefined number of IP notifications to the mobile communication device during the predefined period of time such that the second group of mobile communication devices includes a portion of the second number of mobile communication devices that have not received more than the predefined number of IP notifications during the predefined period of time;

transmitting by the computer system the first IP notification via a wireless network to a first portion of the first group of mobile communication devices;

transmitting by the computer system the second IP notification via a wireless network to each of the second group of mobile communication devices;

receiving input from at least some of the second group of mobile communication devices, the input indicating a response to the at least some of the portion of the first group of mobile communication devices to the first IP notification, the input received prior to all of the portion of the first group of mobile communication devices receiving the first IP notification;

modifying the first score of the likelihood for mobile communication devices to respond favorably to the first IP notification according to the received input;

re-identifying the first group at least in part based on the modified first score and the restriction against sending more than the predefined number of IP notifications to the mobile communication device during the predefined period of time, wherein the re-identified first group of mobile communication devices includes at least some mobile communication devices not previously present in the first group of mobile communication devices and at least some of a second portion of the first group of mobile communication devices, the first group of mobile communication devices being dynamically separated into the first portion and the second portion at the time of the re-identifying as a campaign to transmit the first IP notification is ongoing based on consideration of the restriction across a plurality of concurrently executing campaigns; and transmitting the first IP notification to each of the re-identified first group of mobile communication devices.

2. The method of claim 1, wherein the restriction against sending more than a predefined number of IP notifications to a mobile communication device during the predefined period of time is a restriction against sending more than 5 IP notifications to a mobile communication device during a 24 hour period of time.

3. The method of claim 1, wherein identifying by the computer system the first group of the first number of mobile communication devices associated with the first request and the second group of the second number of mobile communication devices associated with the second request comprises sequentially:

identifying a first subgroup of the first group of the first number of mobile communication devices, after identifying the first subgroup of the first group then identifying a first subgroup of the second group of the second number of mobile communication devices, after identifying the first subgroup of the second group then identifying a second subgroup of the first group of the first number of mobile communication devices, and after identifying the second subgroup of the first group of the first number of mobile communication devices then identifying a second subgroup of the second group of the second number of mobile communication devices, whereby competition by the first and second requests to send IP notifications to a common set of mobile communication devices is equitably resolved.

4. The method of claim 1, wherein when the same mobile communication device is identified by both the first group and the second group, and when sending both the first IP notification and the second IP notification of the mobile communication device would violate the restriction against sending more than the predefined number of IP notifications to the mobile communication device during a predefined period of time, the mobile communication device is conceded to the first group if the first score is higher than the second score and is conceded to the second group if the second score is higher than the first score.

5. The method of claim 1, wherein the first score and the second score is determined based on a regression analysis.

6. The method of claim 1, wherein the regression analysis takes into consideration demographics of subscribers associated with the mobile communication devices, how long each mobile communication device has been activated, a mobile application installation history of at least some of the mobile communication devices, and a communication history of at least some of the mobile communication devices.

7. A system for conducting an Internet protocol (IP) notification campaign to encourage installation of mobile applications on targeted mobile communication devices, comprising:

a data store comprising historical data of previous IP notification campaigns and historic models predicting likelihood of installation of mobile applications associated with the campaigns; and a computer system comprising:

a processor;

a non-transitory memory; and a notification campaign application stored in the non-transitory memory that, when executed by the processor receives a request to send an IP notification to targeted mobile communication devices that identifies a number of mobile communication devices to send the IP notification to and a content of the IP notification, where the content comprises a link for installing a mobile application associated with the IP notification, selects a historic model from the data store based on similarity between the request and data of previous IP notification campaigns, selects a first group of mobile communication devices as a first predefined percentage of the identified number of mobile communication devices based on the historic model and based on a restriction against sending more than a predefined number of IP notifications to a mobile communication device during a predefined period of time, wherein the first group is selected such that the first group of mobile communication devices includes a portion of the targeted mobile communication devices that have not received more than the predefined number of IP notifications during the predefined period of time, transmits the IP notification to the selected first group of mobile communication devices, analyzes a first response of the selected first group of mobile communication devices to the IP notification prior to the IP notification being sent to all mobile communication devices of the first group of mobile communication devices, creates a first revised model for predicting likelihood of installation of the mobile application associated with the request based on the historic model and based on the analysis of the response of the selected first group of mobile communication devices, selects a second group of mobile communication devices based on the first revised model and the restriction against sending more than the predefined number of IP notifications to a mobile communication device during the predefined period of time, wherein the second group of mobile communication devices is selected such that the second group of mobile communication devices includes a portion of the targeted mobile communication devices that have not received more than the predefined number of IP notifications during the predefined period of time, wherein the second group of mobile communication devices includes at least some mobile communication devices not previously present in the first group of mobile communication devices and at least some mobile communication devices present in the first group of mobile communication devices but which have not yet received the IP notification, and wherein the second group of mobile communication devices is selected dynamically as a campaign to transmit the IP notification is ongoing based on consideration of the restriction across a plurality of concurrently executing campaigns, and transmits the IP notification to the selected second group of mobile communication devices.

8. The computer system of claim 7, wherein any one of the mobile communication devices is one of a mobile phone, a personal digital assistant (PDA), a media player, a wearable computer, a headset computer, a laptop computer, a tablet computer, or a notebook computer.

9. The computer system of claim 7, wherein the notification campaign application transmits the IP notification to the first and second group of mobile communication devices at least partly via a wireless link, where the wireless link is provided according to one of a long term evolution (LTE), a code division multiple access (CDMA), a global system for mobile communications (GSM), or a worldwide operability for microwave access (WiMAX) wireless telecommunication protocol.

10. The computer system of claim 7, where the notification campaign application further analyzes a response of the selected second group of mobile communication devices to the IP notification, creates a second revised model for predicting likelihood of installation of the mobile application associated with the request based on the first revised model and based on the analysis of the response of the selected second group of mobile communication devices, selects a third group of mobile communication devices based on the second revised model and subject to a restriction against sending more than a predefined number of IP notifications to a mobile communication device during a predefined period of time, and transmits the IP notification to the selected third group of mobile communication devices.

11. The computer system of claim 10, wherein the second group of mobile communication devices is selected as a second predefined percentage of the identified number of mobile communication devices and the third group of mobile communication devices is selected as a third predefined percentage of the identified number of mobile communication devices.

12. The computer system of claim 11, wherein the first predefined percentage, the second predefined percentage, and the third predefined percentage are about equal.

13. The computer system of claim 11, wherein the first predefined percentage is about 15 percent, the second predefined percentage is about 35 percent, and the third predefined percentage is about 50 percent.

14. A computer system for conducting an Internet protocol (IP) notification campaign to encourage installation of mobile applications on targeted mobile communication devices, comprising:

a processor;

a non-transitory memory; and a notification campaign application stored in the non-transitory memory that, when executed by the processor receives a request to send a first IP notification to targeted mobile communication devices that identifies a number of mobile communication devices to send the IP notification to and a content of the IP notification, where the content comprises a link for installing a mobile application associated with the IP notification, analyzes information associated with a plurality of mobile communication devices based on the request to send the IP notification, where analyzing the information comprises determining when the mobile communication devices were activated to receive wireless communication service on a wireless communication network, determining capabilities of the mobile communication devices based on a make and model of the mobile communication devices, determining mobile application installation histories of subscribers associated with the mobile communication devices, determining daily cycles of communication activity level of the mobile communication devices, and determining a number of IP notifications previously sent to the mobile communication devices during a predefined period of time, determines a score for each of the analyzed plurality of mobile communication devices based on the content of the IP notification, based on the analysis, and based on a restriction against sending more than a predefined number of IP notifications to a mobile communication device during the predefined period of time, selects the number of mobile communication devices identified in the request having the highest score, wherein each of the selected number of the analyzed plurality of mobile communication devices have received fewer than the predefined number of IP notifications during the predefined period of time, transmits the IP notification to a portion of the selected mobile communication devices via a wireless communication network, receives input from at least some of the portion of the selected mobile communication devices, the input indicating a response to the at least some of the portion of the selected mobile communication devices to the first IP notification and received prior to all of the portion of the selected mobile communication devices receiving the first IP notification, modifies the first score of the likelihood for mobile communication devices to respond favorably to the first IP notification according to the received input, re-selects mobile communication devices at least in part based on the modified first score and the restriction against sending more than the predefined number of IP notifications to the mobile communication device during the predefined period of time, wherein the re-selected mobile communication devices include at least some mobile communication devices not previously present in the selected mobile communication devices and at least some of a second portion of the selected mobile communication devices that have not yet received the IP notification, the selected mobile communication devices being dynamically separated into the portion and the second portion at the time of the re-selecting as a campaign to transmit the first IP notification is ongoing based on consideration of the restriction across a plurality of concurrently executing campaigns, and transmits the first IP notification to each of the re-identified first group of mobile communication devices.

15. The computer system of claim 14, wherein the restriction against sending more than a predefined number of IP notifications to the mobile communication device during the predefined period of time is a restriction against sending more than 5 IP notifications to the mobile communication device during a 24 hour time period.

16. The computer system of claim 14, wherein the restriction against sending more than a predefined number of IP notifications to the mobile communication device during the predefined period of time is a restriction against sending more than 8 IP notifications to the mobile communication device during a 24 hour time period.

17. The computer system of claim 14, wherein the restriction against sending more than a predefined number of IP notifications to the mobile communication device during the predefined period of time is a restriction against sending more than 10 IP notifications to the mobile communication device during a 24 hour time period.

18. The computer system of claim 14, wherein the notification campaign application excludes from scoring mobile communication devices that have already installed the mobile application associated with the IP notification.

19. The computer system of claim 14, wherein any of the mobile communication devices is one of a mobile phone, a personal digital assistant (PDA), a media player, a wearable computer, a headset computer, a laptop computer, a tablet computer, or a notebook computer.

* * * * *